United States Patent [19]
Ruggeri

[11] 3,866,110
[45] Feb. 11, 1975

[54] ELECTRICAL GENERATION AND CONTROL DEVICE

[75] Inventor: Luigi Ruggeri, Milan, Italy

[73] Assignee: Ercole Marelli & C. S.p.A., Milan, Italy

[22] Filed: Nov. 13, 1973

[21] Appl. No.: 415,374

[30] Foreign Application Priority Data
Nov. 17, 1972 Italy.................................. 31806/72

[52] U.S. Cl...................... 322/57, 310/187, 322/58, 322/95, 322/63
[51] Int. Cl. ......................................... H02k 11/00
[58] Field of Search ........... 310/166, 171, 187, 198; 322/6, 20, 32, 47, 57, 58, 66, 89, 90, 95, 63

[56] References Cited
UNITED STATES PATENTS

| | | | |
|---|---|---|---|
| 2,939,069 | 5/1960 | Dvoracek.............................. | 322/57 |
| 3,248,641 | 4/1966 | Wolanin................................ | 322/95 |
| 3,538,422 | 3/1970 | Gadd .................................... | 322/58 |

Primary Examiner—J. D. Miller
Assistant Examiner—Robert J. Hickey
Attorney, Agent, or Firm—Waters, Roditi, Schwartz & Nissen

[57] ABSTRACT

An electric generation and control device, which comprises an inductor and an armature provided with a double three-phase winding. Each phase of the armature consists of a generation winding and of a smoothing and control winding, which is electrically in series relationship with the generation winding and both electrically and mechanically phase shifted in advance with respect thereto. The smoothing and control winding is formed by at least two turns in series as wound on two columns of at least a closed saturable core identified in the armature magnetic stack, the columns having such a cross-section and arrangement as to be cyclically saturable and unsaturable by the inductor flux. The spirals wound on the columns have such directions as to produce mutually additive fluxes, which are the one additive and the other subtractive with respect to the inductor flux. The saturable cores of contiguous phases are magnetically coupled to each other by bridges of magnetic material arranged so as to connect the cores mutually in parallel with respect to the inductor flux during the saturation of the same cores by the inductor flux.

Several advantages, as higher speed of response, self-limitation of internal fault currents, self-limitation of external short-circuit currents and inductor field flux relatively free of variation, are thus obtained with respect to prior art.

7 Claims, 7 Drawing Figures

ELECTRICAL GENERATION AND CONTROL DEVICE

This invention relates to an AC electrical generator which is particularly, but not exclusively, intended to supply through a semiconductor-diode rectifier a DC load and more particularly, but not exclusively, to feed the excitation winding of a synchronous electric machine.

It is known that the feed of the excitation winding of a synchronous electric machine is usually obtained through the use of static thyristor exciting device or a rotating exciting device of the brushless type, as formed by an AC generator having a rotary armature whose output current is rectified by diodes mounted integrally with said armature. The first of these methods has the advantage of permitting a high response speed and the almost instantaneous obtention of the forcing or ceiling voltage with a consequent improvement of stability, whereas the second approach has the advantage of permitting the obtention of an excitation voltage which is independent of the voltage at the terminals of the principal synchronous machine, while avoiding the presence of sliding contacts, and affording a simpler control system.

An object of the present invention is to provide an electrical generator which, when employed for feeding the excitation winding of a synchronous electric machine, combines the advantages afforded by both the static and the rotary exciter.

Another object of the invention is to provide an electric generator which, when employed in the manner outlined above, affords in addition the following further advantages over the rotary exciter:

a, Self-limitation of the internal fault currents, as due for example to short-circuiting of one diode, and consequent protective action on the semiconductive diodes, which have been left unaffected, of the rectifier as inserted between the exciter and the excitation winding of the principal synchronous machine, as well as the windings of the exciter itself. This fact permits to do away, either partially or totally, with the expensive fuses (rotary) which are normally provided for in series with the diodes while reducing, as a result, also the rotating masses without prejudicing the reliability in operation.

b, Self-limitation of the overcurrents as due to short-circuiting of the output terminals of the exciter or to equivalent conditions such as those brought about by abrupt variations in the load of the principal synchronous machine.

c, Self-limitation of the induction currents as produced during the asynchronous operation of the principal synchronous machine (especially when this acts as a motor) and the relevant overvoltages as applied to the diodes.

d, Output current which is rigorously proportional to the input current.

e, Response speed and forcing features which are inherently improved irrespective of the adoption of further conventional expedients, which can also be employed, to improve these characteristics further.

An additional object of the present invention is, lastly, that of providing an AC electric generator, whose field flux is comparatively devoid of induced variations, both periodical and transient, and thus such as to lend itself to the employment of permanent magnet excitation poles as well as of cryogenic field windings.

According to the invention the above indicated objects are achieved by means of an electrical generation and control device, whose principal feature is the fact that it comprises:

a, An inductor the influence area of whose flux is such as to involve simultaneously at least two contiguous phases at a time in the magnetic circuit of the armature;

b, An armature having a double winding with at least three phases arranged in a magnetic armature stack, each phase being formed by:

A generating winding arranged so that the cyclical variations of the inductor flux may induce therein an AC voltage.

A leveling and regulating winding electrically connected in series with said generation winding and electrically and mechanically phase-shifted in advance with respect to it, said leveling and regulating device being formed by at least two serially arranged coils wound on the two columns of at least a closed saturable core identified in the armature magnetic stack, said column having such a cross-section and such an arrangement as to be cyclically saturated and unsaturated by the inductor flux, the coils wound on said columns having such directions as to produce therein fluxes which are additive with respect to one another, but the one additive and other subtractive with respect to the inductor flux, the saturable cores of contiguous phases being magnetically coupled with one another by bridges of a magnetic material.

It is thus apparent that the present invention has taken its basis from the known saturable static reactors of the kind having series connected windings and high impedance control circuit, for example as described in H.F. Storm "Series connected saturable reactor with control source of comparatively high impedance" AIEE Trans., Paper 50-205.

As is known, this kind of reactor has the interesting property of possessing a high response speed. Under theoretical conditions, the output current follows oscillo-graphically, that is, instant for instant of time and without any appreciable delay, the variations of the input current. It has, however, a defect which has hitherto prevented its application to power circuits: the output (or load) winding of the reactor induces in the input (or control) winding even order harmonics, whose removal or attenuation requires the addition of an impedance in series with the input circuit. The ohmic component of this impedance reduces the gain which can be obtained, and the induction component reduces the rapidity of the response. This kind of reactor has been restricted as to its use heretofore to applications in small power or measuring circuits only, in which the input winding has the DC current to be measured flowing therethrough and is formed by a few convolutions only or, under limiting conditions, by a single convolution, and the output winding is the metering winding. The gain in this case is thus less than the unity, since, as is known, it is a function of the ratio of the winding convolutions at the input to the winding convolutions at the output.

In the generator according to the present invention the reaction of the output winding on the input one has conversely been eliminated for the following reason:

On account of the angular width of the influence area of the inductor field (an area which corresponds to the extension of the pole shoes of the inductor if the latter is of the salient pole type) there are simultaneously conducting at least two saturable reactors, physically contiguous and electrically belonging to cyclically consecutive phases, each of which reactor is composed by at least two serially wound convolutions which are wound in directions which are mutually contrary on two columns which are interconnected by the magnetic stack of the armature and the armature winding. While the antagonistic column (that is the one carrying the convolution which generates the flux which is subtractive with respect to the inductor flux) of the first reactor is increasing its reaction flux, the antagonistic column of the second reactor is decreasing its flux, that is, undergoes an equal and opposite variation. Since the two columns are connected in parallel to one another and as an assembly they are serially connected with the magnetic circuit of the inductor or input winding, said increase and decrease become mutually annulled with respect to the input winding. Stated otherwise, the variable component of the reaction flux of an antagonist column is closed through the other column without involving the input winding. (This separation between the input and the output windings with respect to the AC component of the reaction flux is exalted by the possible presence of an air-gap between the inductor and the armature.)

Consequently, in the input or control circuit, which in this invention comprises the inductor winding itself, no voltage is virtually induced and the ratio (input turns/output turns) which is the current gain, can thus be made considerably greater than 1 without necessity of any smoothing impedance at the input, and thus without prejudicing the response speed or the gain.

In addition the generation windings apply to the internal control reactors a negative current feedback which is equivalent to an increase of the input resistance and, as is known, has also the advantage of increasing the time constant while reducing the feed voltage fluctuations.

The features of the present invention will be better understood by the ensuing detailed description of a possible embodiment thereof as represented by a three-phasic bipolar generator. It should be clearly understood, however, that the embodiment as described herein is an example only and is no limitation for the invention. More particularly it should be clearly understood that the invention is quite well applicable to generators having any other number of poles and phases.

In the ensuing detailed description reference will be had to the accompanying drawings, wherein.

Figure 1:
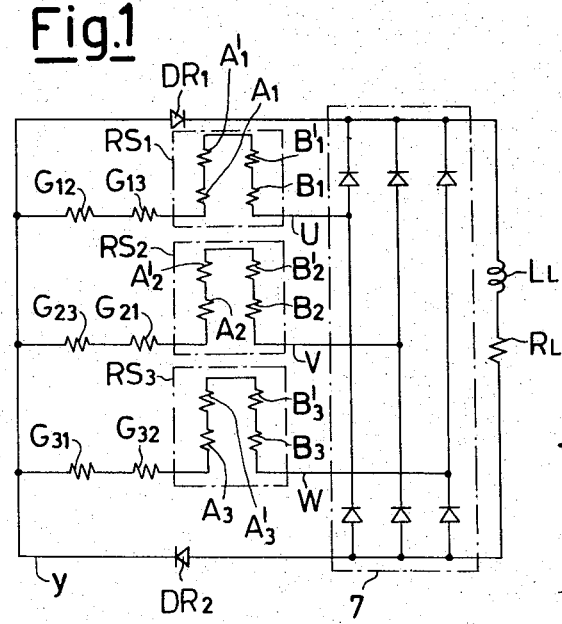
FIG. 1 is the electric diagram of a three-phasic bipolar generator according to the invention as employed for feeding a DC load such as the excitation winding of a synchronous electric machine.
Figure 2:
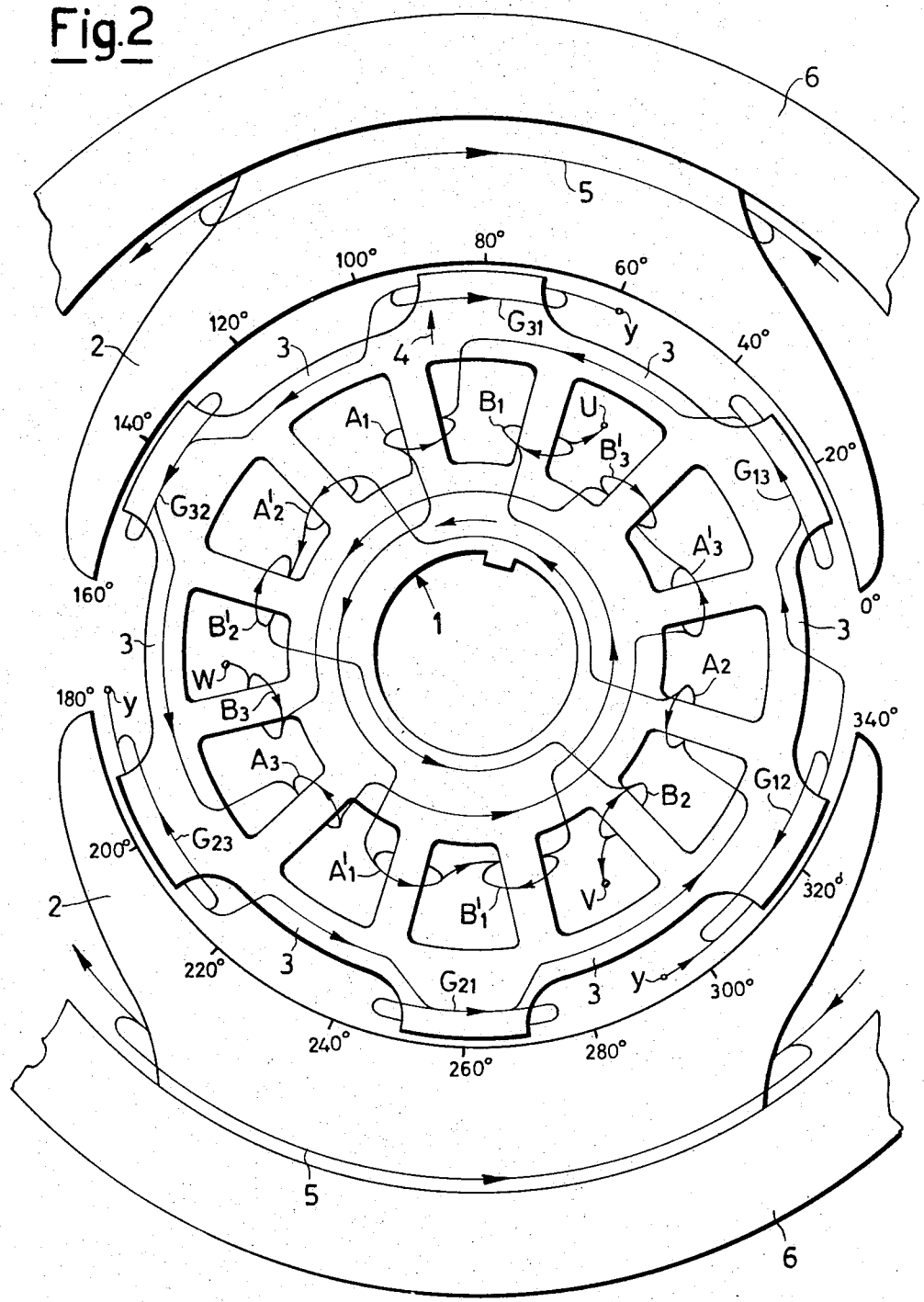
FIG. 2 shows in front view the inductor and armature cores of the generator, on which there have been diagrammatically shown, respectively, the inductor winding and the three phases of the armature winding.

As can be seen in FIGS. 1 and 2, each phase of the armature 1 of the generator shown in the drawings, is formed by a generating winding (G12-G13, G21-G23, G31-G32) and by a smoothing control winding (A1-A'1-B'1-B1, A2- A'2-B'2-B2, A3-A'3-B'3-B3) electrically connected in series with each other. For better clarity and simplification in FIG. 2 there has been shown a single turn for each armature core, but it is obvious that the number of turns is actually higher. As is obvious and clearly shown in FIG. 2, the windings of the three phases are identical, but shifted by 120° the one with respect to the next.

Figure 3:
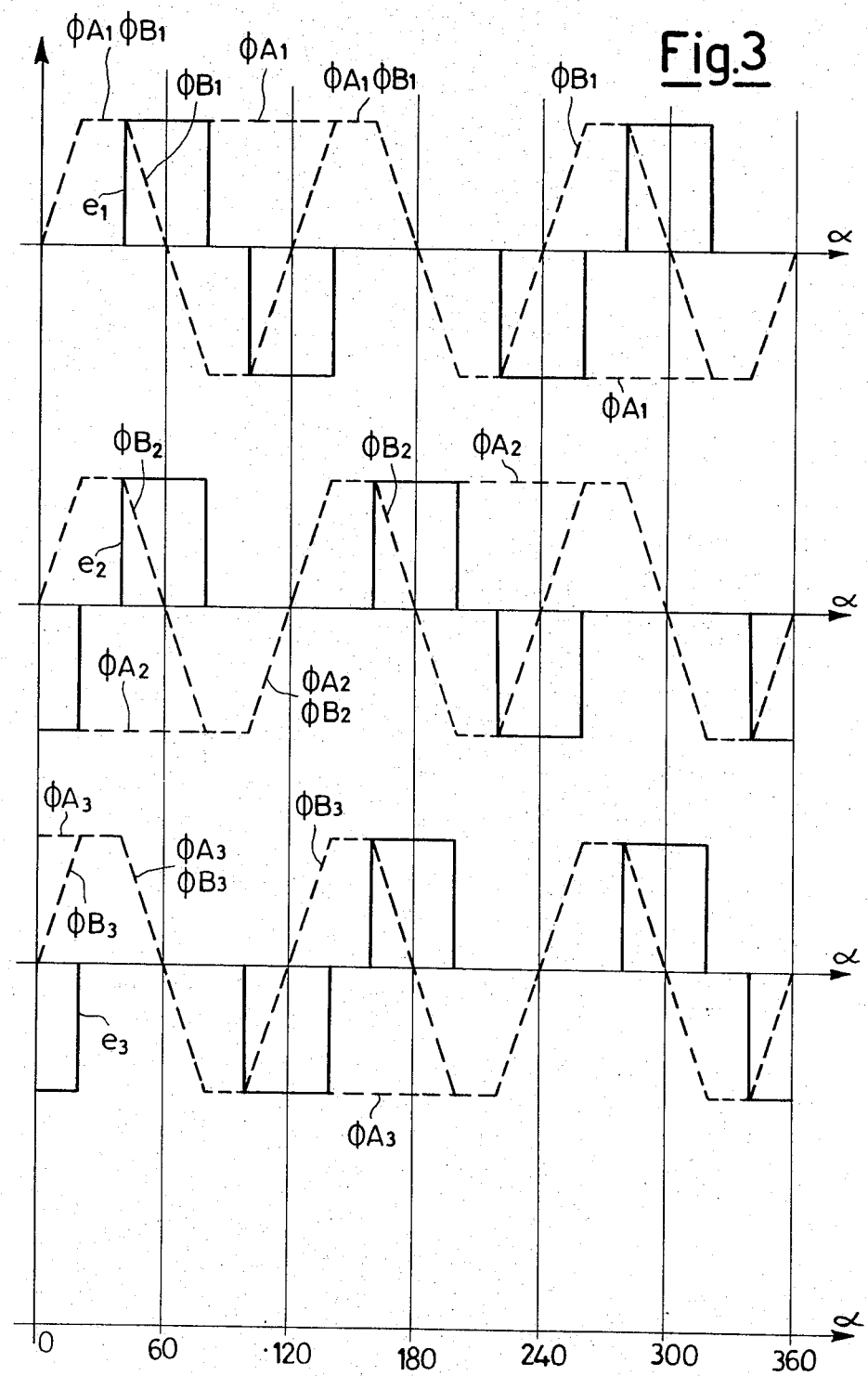
FIG. 3 show a simplified diagram relating to the operation of the generator connected to the load through a rectifier and with a zero load current.

The generating turns are arranged so that their relative motion with respect to the inductor flux (due to a rotation of the armature which has been assumed to be counterclockwise in FIG. 2) induce in the turns an AC voltage, preferably (but not compulsorily) impulsive and such as to encompass an electric angle "alpha" of less than 360°, as shown in FIG. 3.

The smoothing and control winding is formed in turn, for each phase and for each pole, by two concentrated windings (A1-B1, A2-B2, A3-B3 for one pole; A'1-B'1, A'2-b'2, A'3-B'3), for the opposite pole) which are electrically connected in series with each other and wound on respective columns or cores which are interconnected by the magnetic armature stack with directions of winding which are respectively additive and subtractive (or vice versa) relatively to the inductor flux produced by an inductor winding 5 wound over the pole pieces 2 of the inductor 6. Each couple of such windings so concentrated is thus such as to form as an assembly a saturable reactor (RS1, RS2, RS3), which is similar from a functional view point to a static reactor of the known series-type, but is characterized in that the saturation and control flux is the inductor flux itself, and, in the embodiment described herein by way of example only, is applied to said reactor through an air-gap.

The smoothing and control windings of each phase are both mechanically and electrically phase-shifted forwards with respect to the generation windings of the same phase, to which they are electrically connected in series relationship. This shift is such that the feeding pulses of each phase are generated only when the smoothing and control windings of the phase concerned are already immersed in the inductor flux and thus are capable of unfolding their regulation function as will be described in more detail hereinafter.

The reactors of contiguous phases are magnetically coupled to each other through bridges 3 having a function to be explained later.

Each inductor pole 2 has an angular width sufficient to maintain the simultaneous saturation, under the action of its own apere turns, of at least two reactors at a time, as belonging to electrically and physically contiguous phases, for the reasons which will be illustrated hereinafter.

Figure 6:
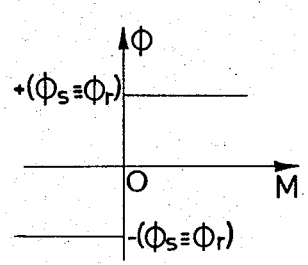
FIG. 6 shows the magnetization ideal characteristic of the material of the armature core of the generator.

The magnetic material of the armature core should preferably have a magnetization characteristic which is as close as possible to the theoretical one as diagrammatically shown in FIG. 6.

The operation of the generator shown in FIGS. 1 and 2 will now be described with reference to the diagrams of FIGS. 3, 4 and 5, wherein $e_1, e_2, e_3$ are the voltage pulses as generated by the windings G of the phases 1, 2 and 3, respectively.

$\phi A_{1,2,3}$; $\phi B_{1,2,3}$ are the magnetic fluxes in the cores or columns on which there are wound the windings A1,2,3 and B1,2,3, respectively.

$I_{L\,1\,2\,3}$ are the phase currents;
$V_{L\,1\,2\,3}$ are the phase voltages;
$V_L$ is the load voltage;
$I_L$ is the load current (for a load which has been assumed to purely resistive).

Figure 4:
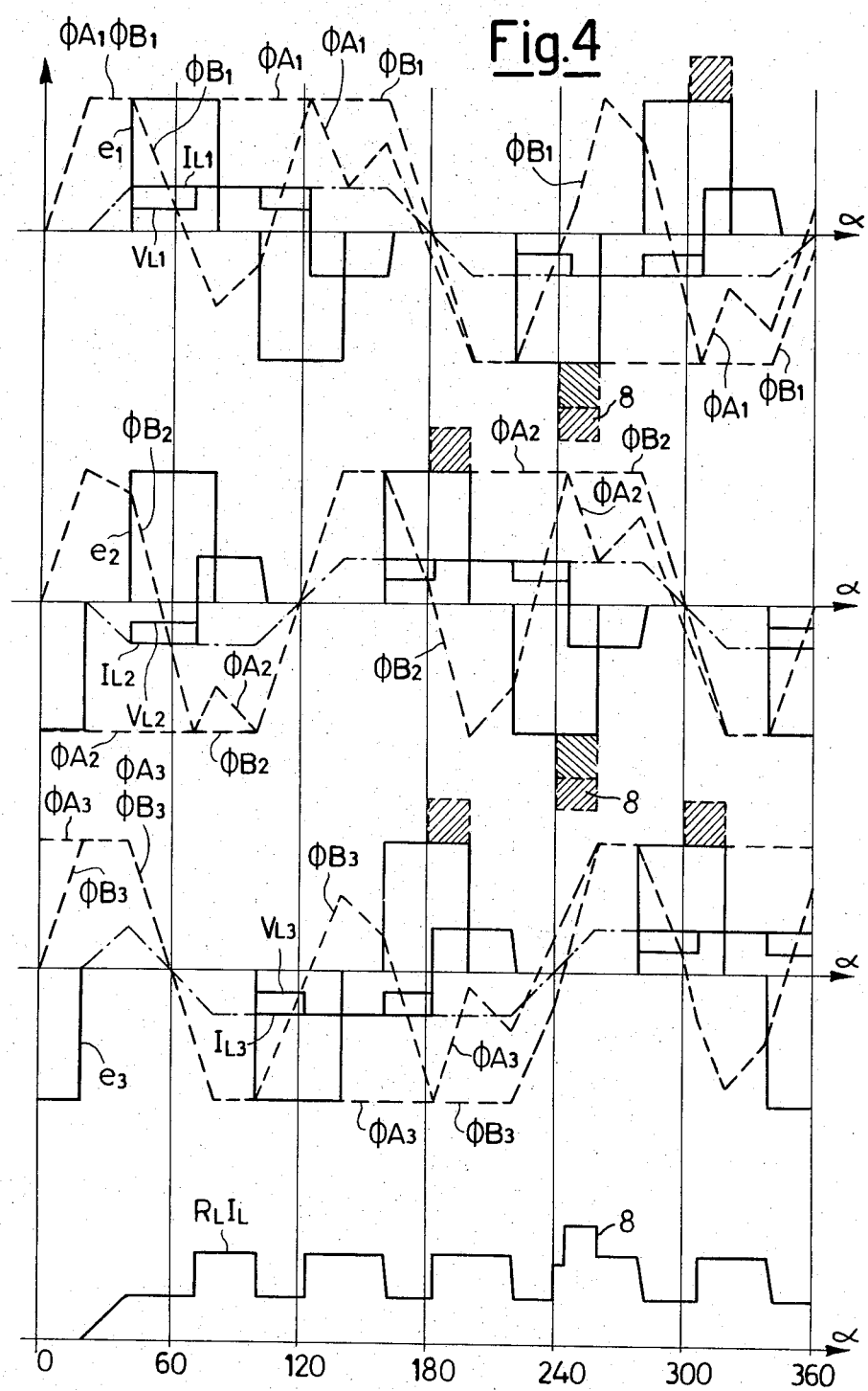
FIG. 4 is a simplified diagram relative to the operation with a reduced-load current of the generator.
Figure 5:
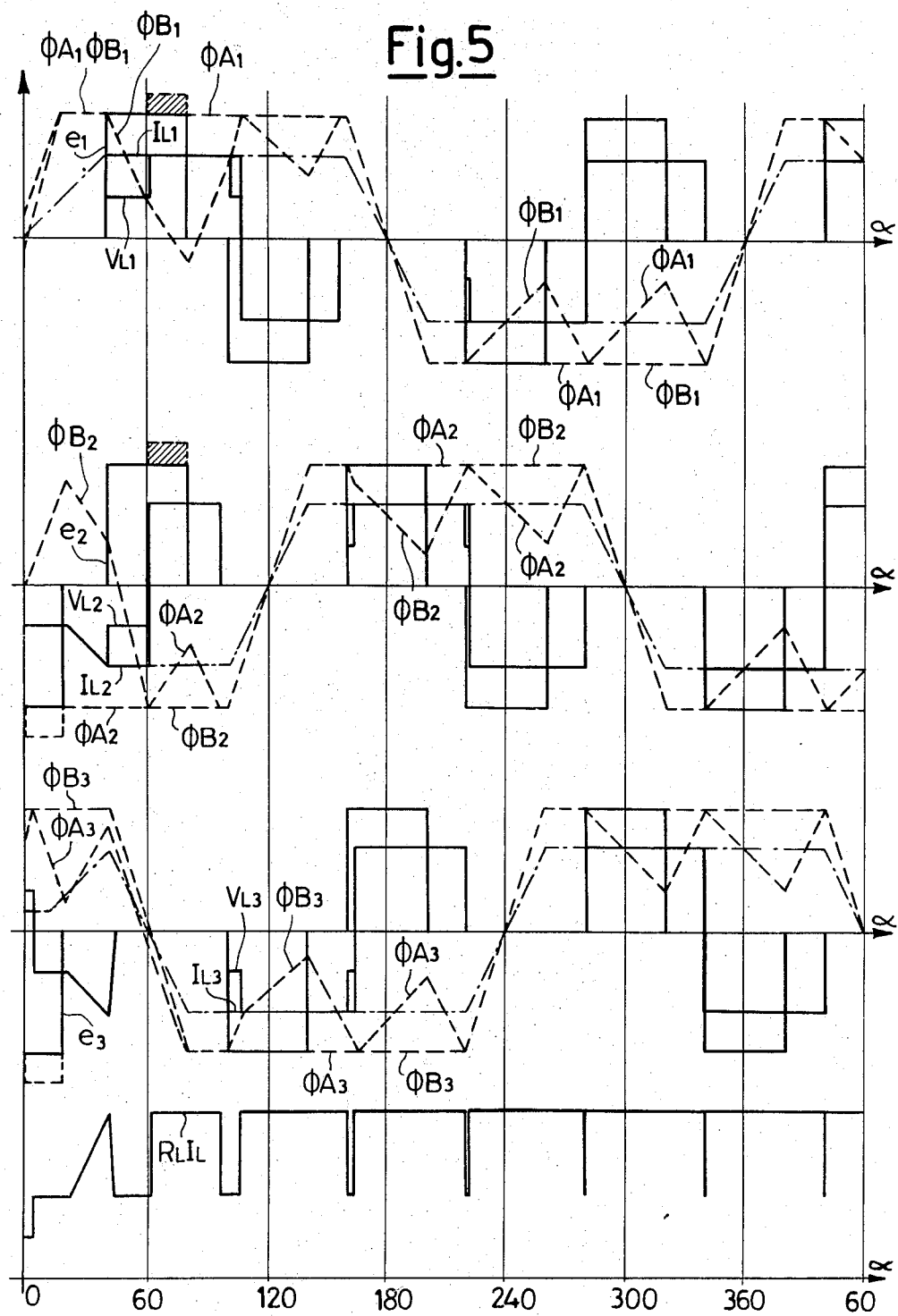
FIG. 5 shows a simplified diagram relative to the operation of the generator with a full load-current.

Reference should also be had to FIG. 2, in which, on the internal periphery of the inductor poles, there has been marked a reference graduation corresponding to the degrees of the angle "alpha" as represented on the abscissae of the plots of FIGS. 3, 4 and 5. The degrees of the angular position of the armature in the instant shown in FIG. 2 are indicated by the arrow 4. No-load operation (Output current nil: generator connected to the load through a bridge rectifier; FIGS. 2 and 3).

At the instant $t = 0$ corresponding to the electric angle 0° (the electric angle coincides with the mechanical angle for a two-pole machine) the reactor RS1 is unmatched from (i.e., out of the area of influence of) both the inductor poles, and the point of operation of its columns or cores on which the windings A1 and B1 are wound is at the 0 point of the hysteresis loop of FIG. 6.

A relative rotation (for example counterclockwise) through 20° of the armature with respect to the inductor causes the matching of the reactor RS1 with the flux of the inductor. In the assumption that the ampere turns of the inductor are only those which are sufficient to overcome the magnetic voltage drop in the remaining part of the circuit, the points of operation of the cores on which the windings A1 and B1 are wound are shifted to $+\phi_S$, whereas those of the cores on which A'1 and B'1 are wound are shifted to $-\phi_S$. All the cores of the reactor RS1 are thus saturated. Since A1 and B1 are wound in opposite directions, the voltages induced therein by the flux variations are mutually annulled and the same is true of the induced voltages in A'1 and B'1. Between alpha = 40° and alpha = 80° the unmatch (from negative pole) and subsequent rematching (to positive pole) of the generation winding G13 generates therein a pulse which, assuming the impedance of the reactor RS1 to be infinite on the unsaturated leg of the characteristic of FIG. 6 with respect to that offered by the load $L_L$, $R_L$ to the same pulse, is entirely absorbed by the antagonistic windings B1-B'1, inducing therein a flux variation which originates the shift towards $-\phi_S$ and towards $+\phi_S$, respectively, of the operation points of the cores on which B1 and B'1 are coiled. As a result, the core of B1 (but the reasoning is true also for the core of B'1) is shifted along the unsaturated leg of the magnetization characteristic of FIG. 6.

This shift is shown in FIG. 3 by the diagram $\phi B1$ as a function of the angle alpha which, in turn, is a linear function of time. This shift, as is known, is proportional, instant for instant, to the volt-seconds absorbed by the reactor, that is, in an appropriate scale, to the integral between 0° and alpha ° of the function $e_{(1,2,3)}$ (alpha).

Obviously, the reactor should be designed so that the flux excursion may reach but not exceed 2 $\phi_s$ as beyond said value the reactor would be negatively saturated with a consequent undesirable application to the load of the volt-seconds of generation that the reactor can no longer absorb.

Starting from the instant of time corresponding to alpha = 180° the negative pulse as generated by the unmatching from negative pole and subsequent matching with the positive pole of the generation winding G12 restores $\phi A2$ in the vicinity of the positive saturation, and so forth.

Meanwhile, that is, between alpha = 0° and alpha = 140°, the flux $\phi A1$ of the additive core remains unaltered since it is kept saturated by the sum of the control ampere turns and the load ampere turns.

A similar reasoning is true for determining the trends of the voltages and fluxes in the remaining portion of the period and for the phases 2 and 3 whose voltage and current trends in a steady state are of course identical to those of the phase 1 but phase-shifted through 120° and 240°, respectively, due to the analogous shift in the position of the relative windings as shown in FIG. 2.

The plots of $\phi A'1$ and $\phi B'1$ have not been shown in FIG. 3 since they can easily be obtained from the plots of $\phi A1$ and $\phi B1$, respectively, by rotation about the alpha axis. The same is true of the other phases.

By comparing the flux curves of the phases 1 and 2 between 40° and 80° it is noted that, assuming as being in the same direction the flux excursions $\Delta\phi$ directed towards the centre to the periphery of the armature, $\Delta\phi_{B1}$ (flux excursions of the core of B1) and $\Delta\phi_{B2}$ (flux excursions in the core of B2) are also in the same direction, and thus $\Delta\phi_{B'1}$ and $\Delta\phi_{B'2}$ are of opposite directions.

This means that the core of B'2 (which is being loaded, that is, is rising towards the positive saturation condition) can be an unsaturated closure path, thus having a low reluctance, for the flux excursion of the core of B1 (which is being unloaded, that is, is going far from the previous positive saturation condition) through the magnetic bridge 3, which, being between magnetically equipotential points, is also unsaturated. Similarly, $\Delta\phi_{B'1}$ is closed on the B2 core.

This low-reluctance closure path is preferential for $\Delta\phi$ with respect to that which leads to the inductor poles through the air-gap and thus avoids that even order harmonics may be induced in the control winding (which in the case in point is the inductor field winding itself).

On the important consequences of these facts reference is made to the introductory part of this specification.

LOAD OPERATION (FIGS. 4 AND 5)

By increasing the ampere turns of the inductor with respect to those which are required for overcoming the magnetic voltage drop in the air-gap and in the remaining portion of the magnetic circuit, ampere turns of regulation become available which (properly increased to take into account the reaction of the armature winding reaction G) allow a load current proportional thereto to flow, according to the known expression of equality of the ampere turns, on the basis of the simplificative assumption as described in the above referred to paper by H.F. Storm.

In FIGS. 4 and 5 there has been shown the trend of the fluxes, voltages and currents, respectively, for a quick transition from the no-load operation to the reduced load-current operation (FIG. 4), and from the latter to the full-load operation (FIG. 5).

The plots of the generated voltages $e\ 1\ e\ 2\ e\ e$ of FIGS. 4 and 5 are identical to those of FIG. 3.

The flux plots are governed by the same criteria as already set forth in connection with FIG. 3, excepted that the flux variation is proportional, rather than to the function $e_{(1\ 2\ 3)}$(alpha), to the integral of the function $e_{(1\ 2\ 3)}$(alpha) $- V_{L(1\ 2\ 3)}$(alpha) since $V_{L(1\ 2\ 3)}$(alpha) is the portion of $e_{(1\ 2\ 3)}$ as absorbed by the load at the instant of time corresponding to a generic angle alpha.

As can be seen, in the two phases which simultaneously conduct, the current has opposite directions for a fraction of the conduction time, and concordant directions in the remaining time. By increasing the ampere turns of control (and thus the load current) the duration of the opposite direction conduction is gradually reduced until being annulled and the conduction in concordant direction is simultaneously and accordingly increased.

As is known, the mode of conduction with phase currents having opposite directions, that is with conductive phases through two by two of which the load current flows in series can be used by inserting between the generator output and the load (for example the excitation winding of an electric synchronous machine) a conventional bridge rectifier circuit (7, FIG. 1). To utilize also the mode of conduction of phase currents having concordant directions, that is with phases through two by two of which the load current flows in parallel, it is necessary to add to the bridge circuit two diodes (DR1 and DR2) connected as shown in FIG. 1. As can be easily shown, the addition of these two diodes permits to reduce as much the current magnitude of the diodes of the bridge and thus (provided that there are at least two diodes in parallel per leg) the bulk and the cost of the rectifier do not increase with respect to the conventional rectifiers. The diodes DR1 and DR2 in addition have the function of recycling and protection.

The transition from the operation condition of zero load current (FIG. 3) to that of reduced load current of FIG. 4, and from that of FIG. 4 to the full load current of FIG. 5, is supposed to be carried out by applying to $I_c$ (not shown in the plot) a linear increase between the instant corresponding to alpha = 20° (electrical) and that corresponding to alpha = 40 electrical degrees.

In the ideal case to which the plots are referred, that is for a magnetic material having the theoretical magnetic characteristic of FIG. 6, the phase current $I_{L(1\ 2\ 3)}$ follows without delay the variations of the control voltage and current, since they occur under constant flux conditions.

The shaded areas in the voltage plots of FIGS. 4 and 5 represent transient overvoltages which occur whenever there is an unbalance between the fluxes in the two cores of a reactor upon unmatching. The presence of the diodes DR1, DR2 (FIG. 1) prevents these overvoltages from being applied to the load, provided that they do not exceed the load voltage $R_L I_L$.

Should they exceed such a value (such as for example between 240° and 260° in FIG. 4) the excess (8) only is applied to the load in a transitional manner.

When the generating winding is located in open slots or around salient teeth as in the exemplary embodiment shown herein, it is appropriate to provide to eliminate the strong harmonics which are induces in the inductor winding by the periodic variation of the number of matched teeth. This can be obtained by circumferentially stepping the inductor pole pieces so that each decrease of cross-section of a tooth which is unmatched from the trailing edge of the pole corresponds to an equal increase of tooth cross-section which is being simultaneously matched to the leading edge.

If $\phi$ is the angular shift between the edges of contiguous poles, a single step of $\phi/2$ in the pole piece permits a satisfactory removal of the tooth pulsation.

From the preceding summary description of the operation of the generator, the reason for its high response speed becomes apparent. Provided that the magnetic material used has a residual induction to saturation induction ratio nearing the unity, the generated voltage remains virtually constant as the output voltage and current are varied from zero to the maximum design value; such a variation takes place with a nearly constant flux and thus requires a very small power, as will be better explained below.

Any abrupt increase of the reference voltage brings to saturation the antagonistic core of each reactor and thus automatically induces the application to the load of the entire ceiling voltage until reaching the desired output current. This permits to simplify the control circuit over the known art, the performance being the same, and is thus conductive to savings.

It is also apparent, on account of the known properties of the series reactor, that fault overvoltages and currents can be limited. The generator in fact has a high impedance for each excess of current with respect to that allowed by the ampere turns equality law and has a low impedance to the load current and is almost insensitive to the short-circuiting of the output terminals.

In the case of short-circuiting of a rectifier diode the current increase, both under transients and steady state conditions in the other diodes and in the generator is extremely reduced and such as to be easily accounted for during design so as to ensure the continuity of operation under internal short circuit conditions. This permits to do away, either partially or totally, with the expensive rotary fuses in the conventional brushless exciter, the result being an economical advantage due not only to the savings in the components cost, but also to the reduction of the rotary masses and the axial bulk. In addition the incorporated reactors are an active protection also for the generator, a protection that the rotary-fuse system of the present art of the excitation brushless system cannot afford. This protection is both preventative and subsequent to a diode failure.

It should be noted that in spite of the presence of a double armature winding the amount of copper required thereby is slightly over that of a single conventional winding, due to the reduced length of the coil ends as allowed by the concentrated windings.

For this reason, due to the high exploitation of the iron and the lesser protrusion of the coil ends, the bulk of the machine does not exceed that of an equivalent AC generator of conventional make.

Figure 7:
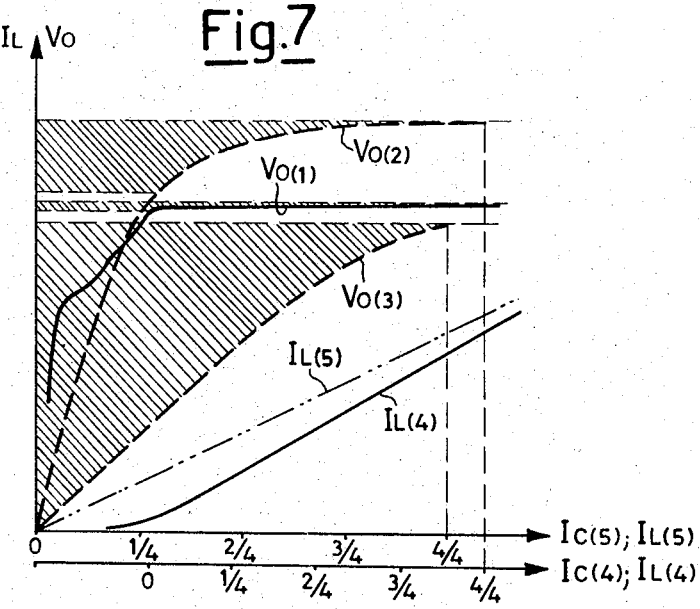
FIG. 7 shows a comparison between the external electric characteristics of a generator according to the invention for an armature core constructed with two different actual materials.

The above described features are the more prominent the better is the magnetic material used, that is the lesser is the ratio between the voltage generated at full load ($V_{0(4/4)}$) and the voltage generated for a zero load current ($V_{0(0/4)}$). In FIG. 7 there has been shown as a suggestion only the trend of the no load voltage and the output direct current as a function of the input or field current $I_C(4)$ current according to the invention, for a material which is close enough to the ideal (isotropic sheet metal containing 48percent nickel, curves $V_0(1)$ and $I_L(4)$) and for a cheaper material (isotropic sheet metal having 3percent silicon, curves $V_0(2)$ and $I_L(4)$). The above indicated curves refer to devices constructed according to the present invention.

As a comparison are shown, in addition, on the same plot, the characteristics of the no load voltage $V_0(3)$ and of the load current $I_L(5)$ as a function of the field or input current $I_C(5)$ of a conventional brushless exciter.

The areas $$\int_{I_c\left(\frac{0}{4}\right)}^{I_c\left(\frac{4}{4}\right)} I_c dV_0$$

shaded at the left of the respective curves 1 2 3 are almost proportional to the variation of the energy of the magnetic field corresponding to the current variation from 4/4 to zero; in the three cases to which the curves refer. It should be noticed that there is a considerable reduction of area in the curves according to the invention over (3) also when using a comparatively cheap material (2).

The constancy of the field flux can permit in addition the use of field poles with permanent magnets or cryogenic, on account of the absence of flux variations and pulsations and thus of the detrimental effects (demagnetization and superconductivity loss, respectively) introduced thereby in these applications.

Although a single embodiment of the invention only has been described and shown, the invention can undergo a number of modifications and changes without departing thereby from the scope of the invention. For example the inductor can be internal to the armature rather than external, as shown herein; the rotary part can be indifferently the inductor or the armature; the generating winding can be mounted on a discrete core other than that carrying the smoothing and control windings, rather than on the same core as shown herein. In addition the inductor flux can be generated by a Ferraris rotary magnetic field as produced by a three-phasic inductor similar to that of as asynchronous machine, and if so both the inductor and the armature can both be stationary.

What is claimed is:

1. An electric generation and control device comprising:
    a. an inductor, the influence area of whose flux is such as to involve at a time at least two contiguous phases simultaneously in the magnetic armature circuit;
    b. an armature having a double winding with at least three phases arranged on a magnetic stack of armature, each phase consisting of:
        a generating winding arranged so that the cyclical variations of the inductor flux induce an AC voltage therein;
        a smoothing and control winding electrically in series relationship with said generation winding and both electrically and mechanically phase shifted in advance with respect thereto, said smoothing and control winding being formed by at least two turns in series as wound on the two columns of at least a closed saturable core identified in the armature magnetic stack, said columns having such a cross-section and arrangement as to be cyclically saturable by the inductor flux, the spirals wound on said columns having such directions as to produce mutually additive fluxes, but the one additive and the other subtractive with respect to the inductor flux, the saturable cores of contiguous phases being magnetically coupled one to the other by bridges of a magnetic material arranged so as to connect said cores mutually in parallel with respect to the inductor flux during the saturation stage of the same cores by the inductor flux.

2. A device according to claim 1, wherein the inductor pole shoes are circumferentially stepped, the number of steps being between one and infinity.

3. A device according to which is electrically connected to the load through a diode rectifier.

4. A device according to claim 3, wherein the rectifier is formed by diodes or diode groups connected to each other and to the generator as shown in FIG. 1.

5. A device according to claim 1, wherein the generation winding is mounted on a second magnetic stack which is separate from and coaxial with the one on which the smoothing and control winding is mounted.

6. A device according to claim 1, wherein the inductor magnetic field is a Ferraris magnetic rotary field.

7. A device according to claim 1, wherein the conductor used for the inductor winding is under superconductivity conditions as obtained by using cryogenic procedures.

* * * * *

UNITED STATES PATENT OFFICE
CERTIFICATE OF CORRECTION

Patent No. 3,866,110      Dated February 11, 1975

Inventor(s) Luigi RUGGERI

It is certified that error appears in the above-identified patent and that said Letters Patent are hereby corrected as shown below:

Column 10, line 37:

The first line of claim 3 should read

--A device according to claim 1 which is electrically con- --

*Signed and Sealed this*

*twenty-third* Day of *December 1975*

[SEAL]

Attest:

RUTH C. MASON
*Attesting Officer*

C. MARSHALL DANN
*Commissioner of Patents and Trademarks*